United States Patent
He

(10) Patent No.: US 6,946,509 B2
(45) Date of Patent: *Sep. 20, 2005

(54) ACRYLATE-FUNCTIONAL ALKYD RESINS HAVING IMPROVED DRY TIME

(75) Inventor: Mingbo He, Streamwood, IL (US)

(73) Assignee: Resolution Specialty Materials LLC, Houston, TX (US)

(*) Notice: Subject to any disclaimer, the term of this patent is extended or adjusted under 35 U.S.C. 154(b) by 31 days.

This patent is subject to a terminal disclaimer.

(21) Appl. No.: 10/356,286

(22) Filed: Jan. 31, 2003

(65) Prior Publication Data

US 2004/0059032 A1 Mar. 25, 2004

Related U.S. Application Data

(60) Provisional application No. 60/412,229, filed on Sep. 20, 2002.

(51) Int. Cl.$^7$ ............... C08K 3/10; C08K 3/18; C08K 3/22
(52) U.S. Cl. ............ 524/413; 524/433; 524/455; 428/458; 428/522
(58) Field of Search .................... 524/413, 433, 524/455; 428/458, 522

(56) References Cited

U.S. PATENT DOCUMENTS

| | | |
|---|---|---|
| 3,196,119 A | 7/1965 | Boller et al. |
| 3,641,201 A | 2/1972 | Hellman |
| 3,734,874 A | 5/1973 | Kibler et al. |
| 3,932,562 A | 1/1976 | Takahashi |
| 4,016,332 A | 4/1977 | Anderson et al. |
| 4,102,944 A | 7/1978 | Fukuyama et al. |
| 4,113,702 A | 9/1978 | Psencik |
| 4,116,903 A | 9/1978 | Lietz et al. |
| 4,131,579 A | 12/1978 | Mummenthey et al. |
| 4,234,466 A | 11/1980 | Takahashi et al. |
| 4,474,941 A | 10/1984 | Wilk et al. |
| 4,517,322 A | 5/1985 | Birkmeyer et al. |
| 4,571,420 A | 2/1986 | Marks |
| 4,690,980 A | 9/1987 | Singer et al. |
| 4,719,254 A | 1/1988 | Levine |
| 4,973,656 A | 11/1990 | Blount |
| 4,983,716 A | 1/1991 | Rao et al. |
| 5,218,042 A | 6/1993 | Kuo et al. |
| 5,288,804 A | 2/1994 | Kim et al. |
| 5,340,871 A | 8/1994 | Pearson et al. |
| 5,348,992 A | 9/1994 | Pearson et al. |
| 5,349,026 A | 9/1994 | Emmons et al. |
| 5,371,148 A | 12/1994 | Taylor et al. |
| 5,378,757 A | 1/1995 | Blount, Jr. et al. |
| 5,484,849 A | 1/1996 | Bors et al. |
| 5,498,659 A | 3/1996 | Esser |
| 5,530,059 A | 6/1996 | Blount, Jr. et al. |
| 5,859,135 A | 1/1999 | Doomen et al. |
| 6,051,633 A | 4/2000 | Tomko et al. |
| 6,242,528 B1 | 6/2001 | Clark et al. |
| 6,262,149 B1 | 7/2001 | Clark et al. |
| 6,323,254 B1 | 11/2001 | Weikard et al. |
| 6,344,503 B1 | 2/2002 | Nkansah et al. |
| 6,476,183 B2 | 11/2002 | Bakkeren et al. |
| 6,534,598 B2 | 3/2003 | Kuo et al. |
| 6,548,601 B1 * | 4/2003 | Kuo et al. ............ 525/224 |

FOREIGN PATENT DOCUMENTS

| | | |
|---|---|---|
| EP | 0 351 024 A2 | 1/1990 |
| EP | 1 002 842 A1 | 5/2000 |
| EP | 1 149 874 A1 | 10/2001 |
| JP | 48-85628 | 11/1973 |
| WO | WO 99/07759 A1 | 2/1999 |
| WO | WO 00/73392 A3 | 12/2000 |
| WO | WO 01/00741 A1 | 1/2001 |

OTHER PUBLICATIONS

Oldring et al., Resins for Surface Coatings, 1987, vol. 1, p. 127.
Oldring et al., Resins for Surface Coatings, 1987, vol. 1, p. 181.
Calbo, Handbook of Coatings Additives, 1987, pp. 496–506.
Witzeman et al., Journal of Coatings Technology, 1990, vol. 62, No. 789, pp. 101–112.
F. Del Rector et al., Journal of Coatings Technology, pp. 31–37, vol. 61, No. 771, Apr. 1989.

* cited by examiner

Primary Examiner—Kriellion A. Sanders
(74) Attorney, Agent, or Firm—Lisa Kimes Jones

(57) ABSTRACT

An acrylate-functionalized alkyd coating composition is disclosed having improved dry time. The compositon includes an acrylate-functionalized alkyd resin, a solvent, and a drier package that provides the composition with a cobalt content of at least 0.01 wt %, based on binder solids content, and a calcium content of from 0.15 wt % to 5 wt %, based on the binder solids content. The drier mixture disclosed results in the coating composition having improved dry time when compared with similar coating compositions using conventional drier packages.

24 Claims, No Drawings

ACRYLATE-FUNCTIONAL ALKYD RESINS HAVING IMPROVED DRY TIME

CROSS REFERENCE TO RELATED APPLICATION

This application claims the benefit of U.S. Provisional Application Ser. No. 60/412,229 filed Sep. 20, 2002.

FIELD OF THE INVENTION

The invention relates to alkyd coating compositions, and more particularly, to acrylate-functional alkyd coating compositions that exhibit improved dry time.

BACKGROUND OF THE INVENTION

In recent years, considerable efforts have been made by the coatings industry to develop coating formulations containing little or no volatile organic compound (VOC) content. Regulations to limit the amount of VOC content of industrial coatings have encouraged research and development to explore new technologies directed at reducing solvent emissions from industrial solvent-based coatings operations used to coat such products as automotive parts, appliances, general metal products, furniture, and the like. However, while the move to reduced organic solvent-based compositions brings health and safety benefits, these lower VOC content coating compositions must still meet or exceed the performance standards expected from solvent-based compositions.

Alkyd resins are one of the most common binders used for ambient-cure, solvent-based coatings. The resistance properties of traditional solvent-borne alkyd resins are developed via autooxidative crosslinking of the alkyd film. Crosslinking occurs when the activated methylene groups in the unsaturated fatty acids or oils of the alkyd are oxidized in air to give hydroperoxides which subsequently decompose to generate free radicals, resulting in oxidative crosslinking. This oxidative crosslinking process is commonly accelerated by adding driers, such as, for example, various salts of cobalt, zirconium, calcium, and manganese. However, while alkyd resins have shown, and continue to show, promise, they have relatively slow "dry" and/or cure times, particularly at ambient temperatures. Various modifications have been made to alkyd resins to address such concerns.

One such attempt includes polymerization of an alkyd resin with a vinyl compound, such as styrene or methyl methacrylate, via a free-radical reaction, to produce a vinyl-alkyd copolymer or a vinyl alkyd. Vinyl alkyd resins generally have a higher molecular weight and a higher $T_g$, producing coatings with reduced tack-free time (solvent evaporation). However, the through-dry time (oxidation of the film) of such coatings is longer due to the decreased degree of unsaturation in the alkyd as a result of copolymerization with the vinyl compound. This problem is described in further detail in *Resins for Surface Coatings*, Vol. 1, pp. 181 et seq., ed. by P. K. T. Oldring and G. Hayward, SITA Technology, London, UK, 1987, which is incorporated herein by reference. An additional drawback is that paint formulations containing vinyl alkyd resins require greater amounts of solvent, due to the increased molecular weight and $T_g$ of the vinyl alkyd.

Conventional long oil alkyds are used throughout the industry as the main binder in high gloss architectural trim enamels. Typical alkyds are made by reacting soybean oil with pentaerythritol (PE) via alcoholysis, and then reacting the reaction product in a second stage with phthalic anhydride (PAN). The result is a long oil alkyd with good through-dry. The use of pentaerythritol provides an alkyd with high branching and number average molecular weight ($M_n$), a light color, improved yellowing resistance, and low cost.

High solids alkyds have been developed for use in high gloss architectural trim enamels having a VOC content of less than 250 g/L. Reduction in viscosity in these resins is achieved by lowering the amount of PE, which results in less branching and a lower $M_n$. One such alkyd is Eastman's Duramac HS 5816, which is made from sunflower oil reacted with pentaerythritol (PE) via alcoholysis, followed by reacting the reaction product with a fatty acid, and then phthalic anhydride. The result is a long oil alkyd having reasonable through dry, light color, and a reasonable cost, but having less satisfactory yellowing resistance.

Thus, there is a trade-off between through dry and yellowing. Less yellowing is observed with less conjugated fatty acids and oils. Another drawback of such systems is that typical high solids alkyds result in paints that exhibit stringiness or ropiness (brush drag and high ICI viscosity).

JP 48085628 describes a modified alkyd resin using glycidyl acrylate, glycidyl methacrylate, or its derivative. Drying oil-modified alkyd resins having carboxyl groups and an oil length of 20–80 are treated with glycidyl acrylate, glycidyl methacrylate, or its derivative, in the presence of a polymerization inhibitor. The resulting resin is mixed with a photosensitizer or photoinitiator to give a coating composition which hardens with UV irradiation. However, the resin compositions disclosed are not suitable for ambient oxidative cure, high-solids coating applications.

PCT Appl. Publ. No. WO 01/00741, incorporated herein by reference, discloses an ambient oxidative cure composition based on an acrylate-functionalized alkyd resin. The acrylate-functionalized alkyd resin is prepared by reacting an alkyd resin having an acid number of from 0 to about 10 mg KOH/g with an acid anhydride, such as trimellitic anhydride, to produce a carboxyl-functional alkyd resin, and reacting the carboxyl-functional alkyd resin with a glycidyl acrylate, to produce an acrylate-functionalized alkyd resin. These acrylate-functionalized alkyd resins are then used in coating compositions in which conventional drier mixtures are used, providing a calcium content in the coating composition of from 0.05% to 0.1% metal based on resin solids, and a cobalt content in the coating composition of from 0.02% to 0.15% metal based on resin solids.

U.S. patent application Ser. No. 09/596,269, filed Jun. 16, 2000 and incorporated herein by reference, describes an acrylate-functional alkyd coating composition comprising an acrylate-functionalized alkyd resin, at least one drier, and water or an organic solvent. The acrylate-functionalized alkyd resin described is the reaction product of an alkyd resin and a glycidyl acrylate such as glycidyl methacrylate, the glycidyl moiety of the glycidyl acrylate being the reactive moiety that functionalizes the alkyd resin. The resulting reaction product contains pendant reactive acrylate moieties.

The compositions described in U.S. patent application Ser. No. 09/596,269 exhibit improved dry time, on the order of 3 hours or more set to touch time, making them suitable for fast-dry, ambient-cure coating applications. These dry times are achieved with conventional drier packages, providing a calcium content in the coating composition of about 0.05% to 0.1% metal based on resin solids, and a cobalt content in the coating composition of from 0.02% to 0.15% metal based on resin solids.

Although these compositions are an advance in the art, there remains a need in the market to further improve the surface dry time of low VOC alkyd paint to a very low level, such as 2 hour set to touch, 4 hour tack free, and 8 hour though-dry, so that the painted surface can be handled in a short time, and so that the surface will exhibit less dust pick up, resulting in cost savings and an improved appearance. This has been very difficult to achieve for low VOC alkyds, because these low molecular weight alkyds characteristically exhibit a longer dry time, during which the molecular weight of the alkyd is built up via crosslinking. Although the acrylate-functional alkyd resins described in U.S. patent application Ser. No. 09/596,269 have improved dry time using conventional drier packages, the set to touch and surface dry time achieved using conventional drier packages are still not fast enough to satisfy some demanding applications.

SUMMARY OF THE INVENTION

The present invention relates to 250 g/l VOC acrylate-functional alkyd coating compositions having improved surface dry time, on the order of 2 hour set to touch, 3 hour tack free, and 5 hour through-dry, resulting from an increase in the calcium content of the drier package, typically provided as a calcium carboxylate, above that used in conventional alkyd drier packages. According to the invention, calcium can replace part of the cobalt of the drier package, typically provided as a cobalt carboxylate, without a loss in dry time, and with improved initial yellowing characteristics.

DETAILED DESCRIPTION OF THE INVENTION

The invention provides an acrylate-functional alkyd coating composition that includes from 0.15 wt % to 5 wt % calcium metal content, or from 0.2 wt % to 2 wt % calcium metal content, or from 0.25 wt % to 1.1 wt % calcium metal content, based on the binder solids content; and at least 0.01 wt % cobalt metal content. The cobalt metal content can also be at least 0.02 wt % cobalt metal content, or in a range of from 0.025 wt % to 0.15 wt % cobalt metal content, based on the binder solids content.

The invention also provides a method of improving the surface dry time of an acrylate-modified alkyd coating composition by increasing the calcium carboxylate content of the drier package above that conventionally used. According to the invention, the calcium content can be raised well above that which is possible in conventional alkyd coating compositions, resulting in a continuing improvement in dry time.

The invention also provides a method of replacing a portion of the cobalt carboxylate used in conventional drier packages with a calcium carboxylate, without a loss in surface dry time. Since the presence of cobalt usually results in more yellowing in the paint film, less cobalt in the paint leads to reduced yellowing. In addition, cobalt is an active surface drier, and excessive cobalt can cause wrinkling in alkyd films, especially when the film thickness is high, and when the paint dries at a high temperature or in direct sunlight. This partial replacement of cobalt by calcium thus reduces the tendency of wrinkling in the resulting paint films. The amount of cobalt according to the invention can nonetheless be higher than 0.15 wt %, based on the binder solids content, when the yellowing characteristics of cobalt need not be minimized, such as in colored or pigmented coating formulations.

Examples of calcium driers suitable according to the invention include, but are not limited to, calcium carboxylates such as calcium neodecanoates, calcium versatates, calcium octoates, and calcium naphthenates. Such calcium driers are available from the OM Group, Inc., and include calcium Ten-Cem®, calcium Cem-All®, calcium Hex-Cem®, and calcium Nap-All®. Similar cobalt driers are available from the same supplier. Other cobalt driers are also available.

Other types of driers, such as zinc, zirconium, and neodymium driers, may also be used, although none are believed to further improve dry time when relatively large amounts of a calcium drier, for example from 0.5% to 1% calcium metal based on binder solids, is provided.

The invention thus provides an acrylate-functionalized alkyd coating composition comprising an acrylate-functionalized alkyd resin; a drier package that provides from 0.15% to 5% calcium content and at least 0.01 wt % cobalt content to the coating composition, based on the binder solids content; and an organic solvent. In another embodiment, the invention provides an acrylate functionalized alkyd coating composition comprising an acrylate functionalized alkyd resin; a drier package that provides from 0.15% to 5% calcium content and at least 0.01 wt % cobalt content to the coating composition, based on the binder solids content; and water. The calcium metal content can advantageously also be from 0.2 wt % to 2 wt % calcium content, or from 0.25 wt % to 1.1 wt % calcium content, while the cobalt content can alternatively be at least 0.02 wt %, based on the binder solids content, or in a range of from 0.025 wt % to 0.15 wt % cobalt content, again based on the binder solids content.

In a preferred embodiment, the acrylate-functionalized alkyd resin, comprises the reaction product of (i) an alkyd resin and (ii) a glycidyl acrylate, the glycidyl moiety of the glycidyl acrylate being the reactive moiety to functionalize the alkyd resin. The resulting reaction product contains pendant reactive acrylate moieties.

The acrylate-functionalized alkyd resin may also be obtained via other reaction schemes. Other sources of acrylate, methacrylate, and vinyl functionality are also suitable according to the invention. Thus, an epoxide group is not strictly necessary in the acrylate, so long as some means for appending the acrylate or vinyl group to the alkyd resin is available, which means preserves the acrylate or vinyl functionality. Suitable acrylates include acrylate esters such as tert-butyl acrylate, tert-butyl methacrylate, methyl acrylate, methyl methacrylate, butyl acrylate, butyl methacrylate, 4-hydroxybutyl acrylate glycidyl ether, and the like. Suitable allylic compounds include allyl glycidyl ether, epoxybutene, and suitable vinyl compounds include 3-isopropenyl-alpha,alpha-dimethylbenzyl isocyanate, and the like.

The invention also provides a method of preparing an acrylate-functionalized alkyd coating composition, comprising the step of contacting an acrylate-functionalized alkyd resin with a drier package that provides from 0.15 wt % to 5 wt % calcium content and at least 0.01 wt % cobalt content to the coating composition, based on the binder solids content, in the presence of an organic solvent. In another embodiment, the invention provides a method of preparing an acrylate-functionalized alkyd coating composition comprising the step of contacting an acrylate-functionalized alkyd resin with a drier package that provides from 0.15 wt % to 5 wt % calcium content and at least 0.1 wt % cobalt content to the coating composition, based on the binder solids content, in the presence of water. The calcium content can advantageously also be from 0.2 wt % to 2 wt % calcium content, or from 0.25 wt % to 1.1 wt % calcium content, while the cobalt content can alternatively be at least 0.02 wt %, based on the binder solids content, or in a range of from 0.025 wt % to 0.15 wt % cobalt content, again based on the binder solids content.

In a preferred embodiment of the invention, an acrylate-functionalized alkyd coating composition contains about 50 to about 98 wt %, based on the total weight of the composition, of an acrylate-functionalized alkyd resin, about 1 to about 50 wt %, based on the total weight of the composition, of an organic solvent, and about 0.01–3.0 wt %, based on the total weight of the composition, of a drier package that provides from 0.15 wt % to 5 wt % calcium content and at least 0.01% cobalt content to the coating composition, based on the binder solids content. According to the invention, the acrylate-functionalized alkyd coating composition, with a drier package that provides from 0.15% to 2% calcium content and from 0.025 to 0.15% cobalt content to the coating composition, based on the binder solids content, exhibits even more improved tack-free and through-dry times when compared with a composition containing conventional amounts of calcium and cobalt content, and may be used in enamel compositions having reduced VOC and fast through-dry and tack-free times. The calcium content can advantageously also be from 0.2 wt % to 2 wt % calcium content, or from 0.25 wt % to 1.1 wt % calcium content, based on the binder solids content, while the cobalt content can alternatively be at least 0.02 wt %, or in a range of from 0.025 wt % to 0.15 wt % cobalt content, again based on the binder solids content.

In another preferred embodiment of the invention, an acrylate-functionalized alkyd coating composition contains about 30 to about 60 wt %, based on the total weight of the composition, of an acrylate-functionalized alkyd resin, about 40 to about 70 wt %, based on the total weight of the composition, of water, and about 0.01–3.0 wt %, based on the total weight of the composition, of a drier package that provides from 0.15% to 5% calcium content and at least 0.01 wt % cobalt content to the coating composition, based on the binder solids content.

An acrylate-functionalized alkyd resin is an alkyd resin containing reactive acrylate groups or moieties. An acrylate-functionalized alkyd resin can be the reaction product of an alkyd resin and a glycidyl acrylate of which the glycidyl moiety is the reactive moiety. In a preferred embodiment of the invention, the acrylate-functionalized alkyd resin comprises the reaction product of: (a) about 85 to about 98 wt %, based on the total composition, of an alkyd resin and (b) about 2 to about 15 wt %, based on the total composition, of a glycidyl acrylate, each as described herein.

Any alkyd resin may be used as a base alkyd resin in a coating composition of the invention. An alkyd may typically be prepared by reacting a diol, a polyol, a polyacid, a monofunctional acid and a fatty acid, fatty ester or naturally occurring, partially-saponified oil, optionally in the presence of a catalyst. Preferably, an alkyd resin is the reaction product of (a) 0 to about 30 mol %, based on the total composition, of a diol, (b) about 10 to about 40 mol %, based on the total composition, of a polyol, (c) about 20 to about 40 mol %, based on the total composition, of a polyacid, (d) 0 to about 10 mol %, based on the total composition, of a monofunctional acid, (e) about 10 to about 50 mol %, based on the total composition, of a fatty acid, fatty ester or naturally occurring oil and, optionally, (f) a catalyst. Suitable examples of each of the components of the alkyd resin include those known in the art including, but not limited to, those discussed below. *Resins for Surface Coatings*, Vol. 1, p. 127, ed. by P. K. T. Oldring and G. Hayward, SITA Technology, London, UK.

The fatty acid, fatty ester, or naturally occurring, partially-saponified oil may be any fatty acid, fatty ester, or naturally occurring, partially-saponified oil known in the art used in the formation of an alkyd resin. In a preferred embodiment, at least one monobasic fatty acid, fatty ester, or naturally occurring-partially saponified oil is used and selected from the following formulae (II), (II), and (III):

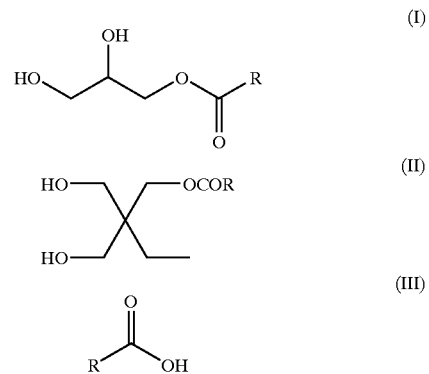

In formulae (I), (II) and (III), R is a saturated or unsaturated $C_8$–$C_{20}$ alkyl group. More preferably, R is one of the following unsaturated $C_{18}$ alkyl groups:

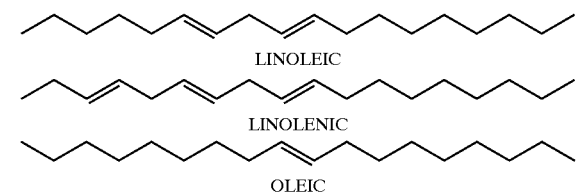

In another embodiment, the monobasic fatty acid or fatty ester oil may be prepared by reacting an oil or a fatty acid with a polyol. Examples of suitable oils include sunflower oil, canola oil, dehydrated castor oil, coconut oil, corn oil, cottonseed oil, fish oil, linseed oil, oiticica oil, soya oil, tung oil, animal grease, castor oil, lard, palm kernel oil, peanut oil, perilla oil, safflower oil, tallow oil, walnut oil, and the like. Suitable examples of fatty acids alone or as components of oil include, but are not limited to, tallow acid, soya acid, myristic acid, linseed acid, crotonic acid, versatic acid, coconut acid, tall oil fatty acid (e.g. PAMOLYN 200, commercially available from Eastman Chemical Co.), rosin acid, neodecanoic acid, neopentanoic acid, isostearic acid, 12-hydroxystearic acid, cottonseed acid, and the like. When acrylate-functionalized resins are formulated with conjugated fatty acids or oils or when alkyds contain conjugated fatty acids or oils, dry times are faster than when conjugated fatty acids or oils are absent from the formulation.

The polyol used in the preparation of the alkyd resin itself or the monobasic fatty acid or fatty ester is preferably selected from aliphatic, alicyclic, and aryl alkyl polyols. Suitable examples of polyols include, but are not limited to, trimethylolpropane (TMP), pentaerythritol (PE), trimethylolethane, erythritol, threitol, dipentaerythritol, sorbitol, glycerine, and the like. Preferably, the polyol is trimethylolpropane (TMP) or pentaerythritol (PE). In addition to the polyol, a diol may be used in the preparation of the alkyd resin. Examples of suitable diols include, but are not limited to, neopentyl glycol (NPG), ethylene glycol, propylene glycol, diethylene glycol, triethylene glycol, tetraethylene, glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl-1,3-pentanediol, 2,2,4-tetramethyl-1,3- cyclobutanediol, p-xylenediol, hydroxypivalyl hydroxypivalate, 1,10-decanediol, and hydrogenated bisphenol A. Preferably, the diol is neopentyl glycol (NPG).

The polyacid (dicarboxylic acid or tricarboxylic acid) and monofunctional acid (monocarboxylic acid) components of the alkyd resin may be any polyacid or monofunctional acid known in the art used in the formation of an alkyd resin. The dicarboxylic acid may be, for example, isophthalic acid, phthalic anhydride(acid), terephthalic acid, adipic acid, tetrachlorophthalic anhydride, dodecanedioic acid, sebacic acid, azelaic acid, 1,4-cyclohexanedicarboxylic acid, 1,3-cyclohexanedicarboxylic acid, maleic anhydride, fumaric acid, succinic anhydride, succinic acid, 2,6-naphthalenedicarboxylic acid, glutaric acid, and the like. Preferably, the dicarboxylic acid is isophthalic acid, phthalic anhydride or phthalic acid. The tricarboxylic acid may be, for example, trimellitic anhydride. A monofunctional acid may also be used such as, for example, benzoic acid, acetic acid, propionic acid, and butanoic acid.

Optionally, a catalyst may be used to promote the formation of an alkyd resin. The catalyst may be any catalyst known in the art used in the formation of an alkyd resin. Preferably, the catalyst is an acid catalyst such as, for example, FASCAT 4100. The amount of catalyst added promotes the formation of an alkyd resin, as described above, and may be determined by routine experimentation as understood by those skilled in the art. Preferably, a catalyst is added in amounts ranging from about 0.01–1.00 wt % based on the amount of reactants.

An alkyd resin may be prepared at a temperature range of about 170–250° C. In a preferred embodiment of the invention, an alkyd resin has an acid number of about 3 to about 80 mg KOH/g, more preferably about 10 to about 35 mg KOH/g, and most preferably about 20 to about 30 mg KOH/g. The alkyd resin has a preferred number average molecular weight from about 700 to about 6500, more preferably at about 1000 to about 3500, and a $T_g$ of less than about 25° C.

In another embodiment of the invention, the alkyd resin further comprises 2 to 10 mol % of a sulfomonomer. The difunctional sulfomonomer is utilized to promote water dispersability and may be a diacid or derivative thereof, containing a —SO$_3$M group. Suitable difunctional sulfomonomers are described in U.S. Pat. Nos. 4,973,656, 5,218,042 and 5,378,757. The metal ion of the sulfonate salt group may be Na+, Li+, K+, Mg++, Ca++, Cu++, Fe++, or Fe+++. Preferably, the metal ion is a monovalent cation. The —SO$_3$M group may be attached to an aromatic nucleus, examples of which include, but are not limited to, benzene, naphthalene, anthracene, diphenyl, oxydiphenyl, sulfonyldiphenyl and methylenediphenyl. For example, the difunctional monomer may be a sodium salt of a sulfoterephthalic acid, 5-sulfoisophthalic acid, sulfophthalic acid, 4-sulfonaphthalene-2,7-dicarboxylic acid, dimethyl 5-sulfoisophthalic acid or a derivative of such acids. Preferably, the difunctional sulfomonomer is 5-(sodiosulfo)-isophthalic acid, 5-(lithiosulfo)-isophthalic acid, or methyl esters thereof. The most preferred difunctional sulfomonomer is 5-(sodiosulfo)-isophthalic acid (SIP).

The SIP-containing alkyd may be prepared by prereacting NPG and SIP at a temperature range of about 150–190° C. followed by the reaction with other reactants. The preferred acid number of the SIP-containing alkyd resin is about 3 to about 50 mg KOH/g.

To enhance water dispersability, another preferred embodiment of the coating composition further comprises an amine. The amine is added to neutralize the carboxyl groups in an acrylate-functionalized alkyd resin to yield ammonium salts which are water dispersible. The amine is present in an amount sufficient to neutralize 70–100% of the carboxyl groups in the acrylate-functionalized alkyd resin. The preferred acid number of the acrylate-functionalized alkyd resin before neutralization is about 40 to about 70 mg KOH/g. Typical amines include, but are not limited to, ammonia, trimethylamine, triethylamine, diethylamine, monoethanolamine, monoisopropanolamine, morpholine, ethanolamine, diethanolamine, N,N-dimethylethanolamine, N,N-diethylethanolamine, N-methyldiethanolamine.

In another embodiment of the invention, the waterborne composition described above further comprises a surfactant. The surfactant is added to effect the successful emulsification of the alkyd resin in water. Suitable surfactants for alkyd emulsification may be anionic, cationic, or nonionic surfactants. Examples of anionic surfactants include alkali metal or ammonium salts of fatty acids; alkyl, aryl, or alkylaryl sulfonates, sulfates, phosphates; and mixture thereof. Examples of nonionic surfactants include alkyl and alkylarylpolydiol ethers such as ethoxylation products of lauryl, oleyl, and stearyl alcohols; alkylphenol glycol ethers such as ethoxylation products of octylphenol or nonylphenol.

An acrylate-functionalized alkyd resin may be prepared by reacting an alkyd resin with a glycidyl acrylate to produce an acrylate-functionalized alkyd resin, as described above. An acrylate-functionalized alkyd resin may be prepared at a temperature range of about 100–170° C., more preferably about 115–165° C., and most preferably, about 125–155° C.

In one embodiment of the invention, a dienophile (e.g., methacrylic acid or maleic anhydride) can be added to the alkyd resin before the addition of a glycidyl acrylate to prereact with any conjugated double bonds present in the alkyd resin via a Diels-Alder reaction. For example, maleic anhydride can be reacted with the alkyd resin at 80° C., followed by addition of glycidyl methacrylate (GMA) at 80° C. to give a glycidyl methacrylate-modified alkyd. Acrylate-functional acrylics may also be incorporated, resulting in a novel type of acrylic-modified alkyd. Resins treated in this fashion exhibit lower viscosities.

In another embodiment of the invention, an acrylate-functionalized alkyd resin is prepared by reacting (a) 0 to about 30 mol % of a diol, (b) about 10 to about 40 mol % of a polyol, (c) about 20 to about 40 mol % of a polyacid, (d) 0 to about 10 mol % of a monofunctional acid and (e) about 10 to about 50 mol % of a fatty acid, fatty ester or naturally occurring, partially-saponified oil, in the presence of a catalyst, each as described above, at about 180–250° C., until the desired amount of the condensate is obtained to form an alkyd resin, wherein the mole percents are based on the total moles of (a), (b), (c), (d) and (e); reacting the alkyd resin with about 2 to about 15 wt %, based on the total weight of the composition, of glycidyl acrylate at about 125–155° C. until an acid number of less than about 5 is obtained, and thereby form the desired acrylate-functionalized alkyd resin, each as described above.

The glycidyl acrylate may be any substituted or unsubstituted acrylate containing an epoxide or glycidyl moiety that upon reaction with an alkyd resin will produce an acrylate-functionalized alkyd resin capable of effecting crosslinking during the curing process, each as described above. According to the invention, upon reaction with an alkyd resin, the glycidyl moiety of the glycidyl acrylate exhibits greater reactivity than the acrylate moiety, i.e. it is the glycidyl moiety which undergoes reaction with the alkyd resin. Suitable substituents for the acrylate portion of the glycidyl acrylate include $C_1$–$C_{18}$ alkyl groups to form classes of compounds such as, for example, alkylacrylates (e.g. methacrylates) and crotonates. Preferably, the glycidyl acrylate is glycidyl methacrylate.

The acrylate-functionalized alkyd resin used according to the invention may also be obtained via other reaction schemes. Other sources of acrylate, methacrylate, and vinyl functionality are also suitable according to the invention. Thus, an epoxide group is not strictly necessary in the acrylate, so long as some means for appending the acrylate group to the alkyd resin is available, which means preserves the acrylate or vinyl functionality. Suitable acrylates include acrylate esters such as tert-butyl acrylate, tert-butyl methacrylate, methyl acrylate, methyl methacrylate, butyl acrylate, butyl methacrylate, 4-hydroxybutyl acrylate glycidyl ether, and the like. Suitable allylic compounds include allyl glycidyl ether, epoxybutene, and the like.

The organic solvent may be any suitable solvent. Examples of suitable organic solvents include, but are not limited to, xylene, benzene, toluene, and mineral spirits. Preferably, the organic solvent is xylene. An acrylate-functionalized alkyd coating composition of the invention has a high solids content of generally greater than about 70%.

The driers used as the drier package in the ambient cure composition of the invention may include any drier known in the art, so long as the drier package provides from 0.15% to 5% calcium content and at least 0.01 wt % cobalt content, based on the binder solids content. Examples of suitable driers include, but are not limited to, various salts of cobalt, zirconium, calcium, zinc, and manganese. Preferred driers are the metal salts of carboxylates having various chain lengths. These driers are well known to those skilled in the art, and are readily available in the marketplace, as described elsewhere herein.

In a preferred embodiment of the invention, an acrylate-functionalized alkyd coating composition, as described above, may also contain at least one pigment, to form an acrylate-functionalized alkyd coating enamel composition. Preferably, the pigment is present in an amount of about 30 to about 60 wt % based on the total weight of the composition. Examples of suitable pigments include those recognized by those of ordinary skill in the art of surface coatings. For example, the pigment may be a typical organic or inorganic pigment, especially those set forth in the Colour Index, 3d Ed., 2d Rev., 1982, published by the Society of Dyers and Colourists, in association with the American Association of Textile Chemists and Colorists. Other examples of suitable pigments include, but are not limited to, titanium dioxide, barytes, clay, or calcium carbonate, CI Pigment White 6 (titanium dioxide); CI Pigment Red 101 (red iron oxide); CI Pigment Yellow 42, CI Pigment Blue 15, 15:1, 15:2, 15:3, 15:4 (copper phthalocyanines); CI Pigment Red 49:1; and CI Pigment Red 57:1. Preferably, the pigment is titanium oxide. Colorants, such as, for example, phthalocyanine blue, molybdate orange, or carbon black may be also added to the ambient cure oxidative cure enamel composition.

The acrylate-functionalized alkyd coating composition of the invention, preferably an acrylate-functionalized alkyd coating enamel composition, may be coated onto a substrate and cured using techniques known in the art (e.g. by spray-applying 3 to 4 mils of wet coating onto a metal panel, and heating in a 150° C. forced air oven for 30 minutes). The substrate may be any common substrate, such as, for example, paper; polyester films such as, for example, polyethylene or polypropylene; metals such as, for example, aluminum or steel; glass; urethane elastomers; primed (painted) substrates, and the like. An acrylate-functionalized alkyd coating composition of the invention may be cured at room temperature (ambient cure).

An acrylate-functionalized alkyd coating composition of the invention may further contain at least one coating additive known in the art. Examples of suitable coating additives include, but are not limited to, leveling and flow control agents such as silicones, fluorocarbons or cellulosics; extenders; plasticizers; flatting agents; pigment wetting and dispersing agents; ultraviolet (UV) absorbers; UV light stabilizers; defoaming and antifoaming agents; anti-settling, anti-sag and bodying agents; anti-skinning agents; anti-flooding and anti-floating agents; and corrosion inhibitors. Specific examples of such additives can be found in Raw Materials Index, published by the National Paint & Coatings Association, 1500 Rhode Island Avenue, N.W., Washington, D.C. 20005. Further examples of such additives may be found in U.S. Pat. No. 5,371,148.

Examples of flatting agents include, but are not limited to, synthetic silica, available from the Davison Chemical Division of W.R. Grace & Company as SYLOID®; polypropylene, available from Hercules Inc., as HER-COFLAT®; synthetic silicate, available from J. M. Huber Corporation, as ZEOLEX®.

Examples of dispersing agents include, but are not limited to, sodium bis(tridecyl) sulfosuccinnate, di(2-ethyl hexyl) sodium sulfosuccinnate, sodium dihexylsulfosuccinnate, sodium dicyclohexyl sulfosuccinnate, diamyl sodium sulfosuccinnate, sodium diisobutyl sulfosuccinnate, disodium iso-decyl sulfosuccinnate, disodium ethoxylated alcohol half ester of sulfosuccinic acid, disodium alkyl amido polyethoxy sulfosuccinnate, tetra-sodium N-(1,2-dicarboxyethyl)-N-octadecyl sulfosuccinnamate, disodium N-octasulfosuccinnamate, sulfated ethoxylated nonylphenol, 2-amino-2-methyl-1-propanol, and the like.

Examples of viscosity, suspension, and flow control agents include, but are not limited to, polyaminoamide phosphate, high molecular weight carboxylic acid salts of polyamine amides, and alkylene amine salts of an unsaturated fatty acid, all available from BYK Chemie U.S.A. as ANTI TERRA®. Further examples include, but are not limited to, polysiloxane copolymers, polyacrylate solution, cellulose esters, hydroxyethyl cellulose, hydroxypropyl cellulose, polyamide wax, polyolefin wax, hydroxypropyl methyl cellulose, polyethylene oxide, and the like.

Several proprietary antifoaming agents are commercially available and include, but are not limited to, BUBREAK® of Buckman Laboratories Inc.; BYK® of BYK Chemie, U.S.A.; FOAMASTER® and NOPCO® of Henkel Corp./ Coating Chemicals; DREWPLUS® of the Drew Industrial Division of Ashland Chemical Company; TRYSOL® and TROYKYD® of Troy Chemical Corporation; and SAG® of Union Carbide Corporation. Examples of U.V. absorbers and U.V. light stabilizers include, but are not limited to, substituted benzophenone, substituted benzotriazoles, hindered amines, and hindered benzoates, available from American Cyanamid Company as CYASORB UV®, and diethyl-3-acetyl-4-hydroxy-benzyl-phosphonate, 4-dodecyloxy-2-hydroxy benzophenone, and resorcinol monobenzoate.

Examples of solvents are well known, and include, but are not limited to, xylene, mineral spirits, vm&p naphtha, toluene, acetone, methyl ethyl ketone, methyl n-amyl ketone, methyl isoamyl ketone, n-butyl acetate, isobutyl acetate, t-butyl acetate, n-propyl acetate, isopropyl acetate, ethyl acetate, methyl acetate, ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol mono-isobutyrate, ethylene glycol mono-octyl ether, diacetone alcohol, TEXANOL® ester alcohol (2,2,4-trimethyl-1,3-pentanediol monoisobutyrate), Eastman Chemical Company, Kingsport, Tenn., and the like. Such solvents may also include reactive solvents such as, for example, diallyl phthalate, SANTOLINK XI-100® polyglycidyl allyl ether from Monsanto, and others as described in U.S. Pat. Nos. 5,349,026 and 5,371,148.

The examples of various coating compositions of the invention use the following materials not described above:

PAMOLYN 200, a tall oil fatty acid, sold by Eastman Chemical Co. of Kingsport, Tenn.

PAMOLYN 380, a conjugated tall oil fatty acid, sold by Eastman Chemical Co. of Kingsport, Tenn.

FASCAT 4100, an esterification catalyst, sold by M&T Chemicals of Rahway, N.J.

Calcium TEN-CEM, a calcium carboxylate, sold by OMG Americas of Westlake, Ohio.

Cobalt TEN-CEM, a cobalt carboxylate, sold by OMG Americas of Westlake, Ohio.

Zirconium HEX-CEM, a zirconium carboxylate, sold by OMG Americas of Westlake, Ohio.

NEO-CEM 250, a neodynium carboxylate, sold by OMG Americas of Westlake, Ohio.

Skino #2, a methyl ethyl ketoxime, sold by OMG Americas of Westlake, Ohio.

The following methods were used to evaluate the coatings and films prepared according to the invention.

Set to touch dry time: The coating is considered set to touch when it is touched gently by the fingers and no paint is transferred.

Tack free dry time: The coating is considered tack free if it does not pull fibers when the film surface is in contact with absorbent cotton fibers.

Through-dry dry time: The coating is considered through dry if it is not affected (no wrinkling) by pressing and twisting with the thumb on the surface of the film.

Yellowing: The yellowing of the dried coating film is indicated by the b* value in the CIELAB color system. It is measured in a Gretag Macbeth Color-Eye 7000A Colorometer.

This invention can be further illustrated by the following examples of preferred embodiments, although it will be understood that these examples are included merely for purposes of illustration and are not intended to limit the scope of the invention unless otherwise specifically indicated. It will be understood that variations and modifications are possible and are intended to fall within the spirit and scope of the invention.

EXAMPLES

Example 1
Coating Formulations with Different Calcium Drier Levels

White paints were made using the following formulation, with different calcium drier levels.

| | |
|---|---|
| 213 g | 7.5% glycidyl methacrylate (GMA) modified alkyd |
| 7.3 g | Lecithin Yelkin TS |
| 407 g | R-902 |
| 70 g | mineral spirits |

A sand mil was used to grind the above mixture to 7 Hegman grinding, then the following ingredients were added under slow agitation:

| | |
|---|---|
| 345.9 g | 7.5% glycidyl methacrylate (GMA) modified alkyd |
| 60 g | mineral spirits |
| 2.5 g | 12% Co Ten-Cem (to provide 0.058% Co metal based on resin solids) |
| 9.2 g | 24% Zr Hex-Cem (to provide 0.4% zirconium metal based on resin solids) |
| 6.6 g | Neo-Cem 250 |
| 0.85 g | Skino #2 |

The above paint was made three times, and to each one of them was added a different amount of calcium drier, according to the following:

| | Paint A | Paint B | Paint C |
|---|---|---|---|
| 5% Ca Ten-Cem | 4.8 g (0.05% Ca) | 15.7 (0.15% Ca) | 22.0 (0.21% Ca) |

Example 2
Effect of the Amount of Calcium Drier on Dry Time

The paints in Example 1 were drawn down on a Leneta chart, with 3 mil wet thickness, and allowed to dry in air at 72° F. and 50% humidity. The set to touch dry time of Paint A, B and C are below:

| | Paint A | Paint B | Paint C |
|---|---|---|---|
| Se to touch time | 2 hr 40 min. | 2 hr 15 min. | 1 hr 55 min. |

Example 3
Coating Formulations with Zirconium and Neodymium Driers, and Without Them Paint D: The paint containing Zr and Nd driers was made in the following formulation:

| | |
|---|---|
| 196 g | 7.5% glycidyl methacrylate (GMA) modified alkyd |
| 6.7 g | Lecithin Yelkin TS |
| 375 g | R-902 |
| 74 g | mineral spirits |

A sand mil was used to grind the above mixture to 7 Hegman grinding, then the following ingredients were added under slow agitation:

| | |
|---|---|
| 318.4 g | 7.5% glycidyl methacrylate (GMA) modified alkyd |
| 55 g | mineral spirits |
| 5.3 g | 12% Co Ten-Cem (to provide 0.13% Co metal on resin solids) |
| 8.7 g | 24% Zr Hex-Cem (to provide 0.4% zirconium metal based on resin solids) |
| 7 g | Neo-Cem 250 |
| 26.7 g | 5% Ca Ten-Cem (to provide 0.28% Ca metal based on resin solids) |
| 1.8 g | Skino #2 |

Paint E: The paint containing no Zr and Nd driers was made in the same way as paint D, except that the Zr Hex-Cem and Neo-Cem 250 were not added.

Example 4
Dry Time Comparison with and Without Zr and Nd Driers

Paints D and E in Example 3 were drawn down on a Leneta chart, with 3 mil wet thickness, and allowed to dry in air at 72° F. and 50% humidity. The dry times of these two paints are listed below:

|  | Paint D | Paint E |
| --- | --- | --- |
| Set to touch | 2 hr | 1 hr 45 min. |
| Tack free | 2 hr 30 min. | 2 hr 30 min. |
| Through-dry | 6 hr | 4 hr |

Example 5
Coating Formulations with Different Cobalt and Calcium Drier Level Five paints were made with the following formulation before the drier package was added:

| 200 g | 7.5% glycidyl methacrylate (GMA) modified alkyd |
| --- | --- |
| 275 g | RCL 535 (TiO2) |
| 35.5 g | mineral spirits |

A sand mil was used to grind the above mixture to 7 Hegman grinding, then the following ingredients were added under slow agitation:

| 334 g | 7.5% glycidyl methacrylate (GMA) modified alkyd |
| --- | --- |
| 115 g | mineral spirits |
| 1.7 g | Skino # |

After the paints were made, to each was added the following amount of driers:

2.9 g of 12% Co Ten-Cem and 28 g of 5% Ca Ten-Cem (0.07% Co+0.28% Ca metal based on resin solids)

1.1 g of 12% Co Ten-Cem and 56 g of 5% Ca Ten-Cem (0.026% Co+0.56% Ca metal based on resin solids)

1.1 g of 12% Co Ten-Cem and 28 g of 5% Ca Ten-Cem (0.026% Co+0.28% Ca metal based on resin solids)

2.9 g of 12% Co Ten-Cem (0.07% Co metal based on resin solids)

112 g of 5% Ca Ten-Cem (1.12% Ca metal based on resin solids)

Example 6
Dry Time and Yellowing Comparison of the Paints in Example 5 with Varied Levels of Cobalt and Calcium Driers Each paint in Example 5 was drawn down on a Leneta chart, with 3 mil wet thickness, and allowed to dry in air at 72° F. and 50% humidity.

| Drier level (% metal on resin solids) | Set to touch dry time | Yellowing (b*) |
| --- | --- | --- |
| 0.07% Co + 0.28% Ca | 1 hr 40 min. | 3.6 |
| 0.026% Co + 0.56% Ca | 1 hr 50 min. | 2.8 |
| 0.026% Co + 0.28% Ca | 2 hr 30 min. | 2.65 |
| 0.07% Co | 4 hr | 3.4 |
| 1.12% Ca | 6 days | 2.6 |

Example 7 (Comparative)
Coating Formulations Based on Duramac 50-5070, a Long Oil Alkyd Sold by Eastman Chemical Company, Kingsport, Tenn., with Different Calcium Drier Levels Three batches of paint were made with the following formulation:

| 267.2 g | 50-5070 |
| --- | --- |
| 275 g | RCL 535 |
| 35 g | mineral spirits |

A sand mil was used to grind the above mixture to 7 Hegman grinding, then the following ingredients were added under slow agitation:

| 446 g | 50-5070 |
| --- | --- |
| 20 g | mineral spirits |
| 1.4 g | 12% Co Ten-Cem (to provide 0.03 wt % cobalt based on resin solids) |
| 1.9 g | Skino #2 |

After the paints were made, to each was added the following amount of 5% Ca Ten-Cem:

14 g of 5% Ca Ten-Cem (0.14% Ca metal based on resin solids)

28 g of 5% Ca Ten-Cem (0.28% Ca metal based on resin solids)

56 g of 5% Ca Ten-Cem (0.56% Ca metal based on resin solids)

Example 8 (Comparative)
Coating Formulations Based on Duramac 57-5816, a High Solids Long Oil Alkyd Sold by Eastman Chemical Company, Kingsport, Tenn., with Different Calcium Drier Levels Three batch of paints were made with the following formulation:

| 208 g | 57-5816 |
| --- | --- |
| 275 g | RCL 535 |
| 35 g | mineral spirits |

A sand mil was used to grind the above mixture to 7 Hegman grinding, then the following ingredients were added under slow agitation:

| 347 g | 57-5816 mineral spirits |
| --- | --- |
| 1.4 | 12% Co Ten-Cem (to provide 0.03 wt % cobalt metal based on resin solids) |
| 1.9 | Skino #2 |

After the paints were made, to each was added the following amount of 5% Ca Ten-Cem:

14 g of 5% Ca Ten-Cem (0.14% Ca metal based on resin solids)

28 g of 5% Ca Ten-Cem (0.28% Ca metal based on resin solids)

56 g of 5% Ca Ten-Cem (0.56% Ca metal based on resin solids)

Example 9
Dry Time Comparison of the Paints in Examples 7 and 8

Each paint in Examples 7 and 8 was drawn down on a Leneta chart, with 3 mil wet thickness, and allowed to dry in air at 72° F. and 50% humidity.

|  | Set to touch | Tack free | Through dry |
| --- | --- | --- | --- |
| 50-5070 paint |  |  |  |
| 0.14% Ca | 1 hr 30 min. | 4 hr | >9 hr |
| 0.28% Ca | 2 hr 25 min. | 3 hr 45 min. | >9 hr |
| 0.56% Ca | 2 hr | 2 hr 50 min. | >9 hr |
| 57-5816 paint |  |  |  |
| 0.14% Ca | 2 hr 40 min. | 3 hr 45 min. | >30 hr |
| 0.28% Ca | 2 hr 5 min. | 3 hr 25 min. | >30 hr |
| 0.56% Ca | 2 hr 5 min. | 2 hr 45 min. | >30 hr |

Example 10

Preparation of Base Alkyd Resin 1, Suitable for Use According to the Invention.

A hydroxyl functional resin with the composition of trimethyolpropane/pentaerythritol/isophthalic acid/soybean oil was prepared by using a typical method known in the art for the preparation of polyester coating resins. The resulting resin had an acid number of about 8, hydroxyl number of about 69, number average molecular weight of about 2500, and weight average molecular weight of 20,000.

Example 11

Preparation of Acrylate-functionalized Alkyd Resin 1, Suitable for Use According to the Invention To a three-neck, round-bottom flask equipped with a mechanical stirrer, a water condenser and a nitrogen inlet were charged the alkyd resin 1 of Example 10 (260 g) and glycidyl methacrylate (GMA) (6.58 g, 0.046 mol). The reaction mixture was stirred at 150–160° C. for 2 hr and the acid number determined to be 2.6 mg KOH/g. The mixture was allowed to cool to 130° C. and an additional GMA (1.3 g) added. The reaction was allowed to continue at 160° C. for 1.5 hr to yield a clear resin with an acid number of 1.2.

Example 12

Preparation of Waterborne Alkyd Resin 2 Suitable for Use According to the Invention An NPG/SIP adduct was first prepared by reacting neopentyl glycol (NPG) (827 g, 7.95 mol), 5-sodiosulfoisophthalic acid (SIP) (536 g, 2.00 mol), water (91.9 g) and the acid catalyst FASCAT4100 (1.10 g) in a three-neck, round-bottom flask equipped with a mechanical stirrer, a steam-jacketed partial condenser, a Dean-Stark trap, a nitrogen inlet and a water condenser. The reaction temperature was gradually increased from 110–150° C. in a 45-min period and the distillate collected in the Dean-Stark trap. The reaction was allowed to continue at 150–180° C. for 3 hr and at 190° C. for 4.5 hr until an acid number of 3.0 mg KOH/g was obtained. A portion of the resultant product was used in the following step.

In a separate reactor equipped with the same configuration as above were charged neopenty glycol (NPG) (48.4 g, 0.47 mol), the above NPG/SIP adduct (148 g), pentaerythritol (PE) (42.9 g, 0.32 mole), isophthalic acid (IPA) (97.2 g, 0.59 mol) and FASCAT 4100 (Atochem) (0.34 g). The mixture was allowed to react at 170–190° C. until 16.0 g of the condensate (water) was obtained. After the mixture was cooled, PAMOLYN 200 (Eastman) (423 g, 1.46 mol) was then added. The reaction was allowed to continue at 170–220° C. until an acid number of 9.1 mg KOH/g was obtained. The resulting resin was allowed to cool and subsequently collected.

Example 13

Preparation of Waterborne Acrylate-functionalized Alkyd Resin 2 Suitable for Use According to the Invention To a three-neck, round-bottom flask equipped with a mechanical stirrer, a water condenser and nitrogen inlet were charged the alkyd resin 2 of Example 12 (150 g) and glycidyl methacrylate (GMA) (3.80 g, 0.027 mol). The reaction mixture was stirred at 150° C. for 2.5 hr and the acid number determined to be 3.6 mg KOH/g. The mixture was allowed to cool to 130° C. and an additional GMA (1.90 g) added. The reaction was allowed to continue at 150° C. for 1.5 hr to yield a resin with an acid number of 2.6.

Example 14 (Comparative)

Waterborne Coating Formulations

A coating formulation was prepared by mixing the modified alkyd resin (10.0 g) prepared from Example 13 with water (14.6 g), a drier blend (0.34 g) and Silwet L-77 (OSI Specialties) (0.06 g). A control formulation was also prepared using the unmodified resin from Example 12. The drier blend was prepared by mixing Zirconium HYDRO-CEM (12%, OMG Americas) (26.9 g)(to provide a zirconium content of 0.2 wt % based on resin solids), Cobalt HYDRO-CURE II (OMG Americas) (13.1 g) (to provide a cobalt content of 0.03 wt % based on resin solids) and ethylene glycol monobutyl ether (EB) (10.0 g).

Example 15 (Comparative)

Film Dry Time

The above waterborne coating formulations were drawn down on Leneta chart (3 mil wet thickness) and allowed to dry in air at room temperature. The results of the Through-Dry Thumb test are listed in the table below:

|  | Through-Dry time (hr) |
| --- | --- |
| Unmodified Alkyd 2 | >7 days |
| Acrylate Alkyd 2 | 20 hr* |

*Film surface remained slightly tacky

Example 16

Emulsification of Acrylate-functionalized Alkyd Resin Suitable for Use According to the Invention An acrylate-functionalized alkyd resin as prepared in Example 11 (500 g) was placed in a two-quart stainless steel beaker, followed by the Uniqema products of SCS 4682 (3.3 g), SCS 4683 (24.4 g), SCS 4712 (3.3 g) and Atlas G-3300B. The mixture was brought to 50° C. under gentle agitation with a 2" Cowles blade. Once the proper temperature was reached, the addition of water (441 g), heated to 60° C., was started via a FMI pump. As the addition of water proceeded, the speed of the Cowles blade was gradually increased to 2000 rpm. Once the inversion of the emulsion was confirmed, the speed of the blade was reduced and the remaining water was added to the emulsion.

Example 17

Preparation of Base Alkyd Resin 3 Suitable for Use According to the Invention

A hydroxyl functional resin with the composition of sunflower oil (1050 g, 1.18 mol)/pentaerythritol (284 g, 1.6 mol)/phthalic anhydride (197 g, 1.34 mol)/special fatty acids (Pamolyn 200) (284 g, 0.98 mol)/trimelletic anhydride (109 g, 0.56 mol) was prepared by using a typical method known in the art for the preparation of alkyd coating resins. The resulting resin, had an acid number of about 25, number average molecular weight of about 1600.

Example 18
Preparation of Acrylate-functionalized Alkyd Resin 3 Suitable for Use According to the Invention To a three-neck, round-bottom flask equipped with a mechanical stirrer, a water condenser, and a nitrogen inlet were charged the base alkyd resin 3 of Example 17 (500 g) and glycidyl methacrylate (GMA) (50 g). The reaction mixture was stirred at 150° C. for 2 hr and the final acid number determined to be 5.0 mg KOH/g.

Example 19 (Comparative)
Coating Formulations

A coating formulation was prepared by pregelling 4 g Bentone 38, 3 g methanol, 0.15 g water and 33 g 0% mineral spirits. To this mixture was added 80 g of the modified alkyd resin prepared from Example 18, 79 g Atomite and 280 g titanium dioxide TIPURE R-902 (Dupont). This was dispersed using a high speed mixer and a Cowles blade. The paint was then letdown by adding 284 g of the modified alkyd resin prepared in Example 10, 50 g of 0% mineral spirits, 1.6 g cobalt drier (12%) (to provide 0.05 wt % cobalt, based on resin solids), 3.2 g zirconium drier (12%) (to provide 0.1 wt % zirconium based on resin solids), 3.2 g calcium drier (5%) (to provide 0.05 wt % calcium based on resin solids) and 1 g Exkin #2. A control formulation was also prepared using the unmodified resin from Example 17.

Example 20 (Comparative)
Clear Paint Formulations

Clear paints were made, to determine dry times, using the following formulation:
- 0.05% Cobalt by metal weight of total resin solids
- 0.10% Zirconium by metal weight of total resin solids
- 0.04% Calcium by metal weight of total resin solids
- 0% Mineral spirits to reduce to 70% solids

Example 21 (comparative)
White Paint Formulations

White paints were made using the following formulation:
Pregel: 4 g Bentone 38, 3 g methanol, 0.15 g water and 33 g 0% mineral spirits
- 80 g glycidyl methacrylate (GMA) modified alkyd resin
- 79 g Atomite (calcium carbonate)
- 280 g R-902 (titanium dioxide)

Disperse using a high-speed mixer and a Cowles blade.
Letdown: 284 g GMA modified alkyd resin
- 50 g 0% mineral spirits
- 1.6 g cobalt drier (12%) (to provide 0.05 wt % cobalt based on resin solids
- 3.2 g zirconium drier (12%) to provide 0.1 wt % zirconium based on resin solids)
- 3.2 g calcium drier (5%) (to provide 0.05 wt % calcium based on resin solids)
- 1 g Exkin #2.

Example 22 (Comparative)
Film Dry Time

The above coating formulations were drawn down on Leneta chart (3 mil wet thickness) and allowed to dry in air at room temperature. The results of the Through-Dry Thumb test are listed in the table below:

|  | Surface-Dry Time (hr) | Through-Dry time (hr) |
| --- | --- | --- |
| Unmodified Alkyd 3 | 7.25 | 19 |
| Acrylate Alkyd 3 | 2.25 | 7.5 |

As shown in the above table, the dry time of the alkyd was significantly improved by modifying with GMA.

Example 23 (Comparative)
Coating Formulations with Improved Flow

A coating formulation was prepared as in example 19. The flow of the formulation was adjusted by replacing part of the modified alkyd resin prepared from Example 18 with a non-GMA modified alkyd.

Example 24 (Comparative)
Film Flow Results

The above coating formulations were drawn down on Leneta chart using a NYPC Leveling Test Blade, and allowed to dry in air at room temperature. The results are listed in the table below:

|  | Value (10 = best) |
| --- | --- |
| Unmodified Alkyd 3 | 0 |
| 7:1 Blend | 6 |
| 4:1 Blend | 8 |

As shown in the above table, the flow of the finished paint was significantly improved by blending acrylate functional alkyd resins with nonmodified alkyd resins.

Although specific terms have been employed, they are used in a generic and descriptive sense only and not for purposes of limitation, the scope of the invention being set forth in the following claims.

I claim:

1. An acrylate-functionalized alkyd coating composition, comprising:
   an acrylate-functional alkyd resin;
   a drier mixture that comprises at least 0.01 cobalt metal, based on resin solids, and from 0.15 to 5.0 wt % calcium metal, based on binder solids; and
   a solvent selected from the group consisting of water, an organic solvent, and mixtures thereof.

2. The acrylate-functionalized alkyd coating composition of claim 1, wherein the solvent comprises at least one organic solvent.

3. The acrylate-functionalized alkyd coating composition of claim 1, wherein the cobalt metal is present in an amount of at least 0.02 wt %, based on binder solids.

4. The acrylate-functionalized alkyd coating composition of claim 1, wherein the cobalt metal is present in an amount of from 0.025 wt % to 0.15 wt %, based on binder solids.

5. The acrylate-functionalized alkyd coating composition of claim 1, wherein the calcium metal is present in an amount of from 0.2 wt % to 2 wt %, based on binder solids.

6. The acrylate-functionalized alkyd coating composition of claim 1, wherein the calcium metal is present in an amount of from 0.25 wt % to 1.1 wt %, based on binder solids.

7. The acrylate-functionalized alkyd coating composition of claim 1, wherein the drier mixture comprises at least one cobalt carboxylate and at least one calcium carboxylate.

8. The acrylate-functionalized alkyd coating composition of claim 1, wherein:
   the acrylate-functional alkyd resin is present in an amount of from about 50 to about 98 wt %, based on the total composition;
   the drier is present in an amount of from about 0.01 to about 3.0 wt % of metal, based on the total composition; and
   the solvent is present in an amount of from about 1 to about 50 wt %, based on the total composition.

9. The acrylate-functionalized alkyd coating composition of claim 1, wherein the acrylate-functional alkyd resin comprises the reaction product of:

(a) from about 85 to about 98 wt %, based on the total composition, of a base alkyd resin; and (b) from about 2 to about 15 wt %, based on the total composition, of a glycidyl acrylate.

10. The acrylate-functionalized alkyd coating composition of claim 9, wherein the base alkyd resin comprises the reaction product of:

(a) from 0 to about 30 mole %, based on the total composition of the base alkyd resin, of a diol;

(b) from about 10 to about 40 mole %, based on the total composition of the base alkyd resin, of a polyol;

(c) from about 20 to about 40 mole %, based on the total composition of the base alkyd resin, of a polyacid;

(d) from 0 to about 10 mole %, based on the total composition of the base alkyd resin, of a monofunctional acid; and (e) from about 10 to about 50 mole %, based on the total composition of the base alkyd resin, of a fatty acid, a fatty ester, or a naturally occurring oil.

11. The acrylate-functionalized alkyd coating composition of claim 10, wherein the base alkyd resin further comprises from about 2 to about 10 mole % of a sulfomonomer.

12. The acrylate-functionalized alkyd coating composition of claim 10, wherein the diol comprises neopentyl glycol; the polyol comprises at least one of trimethylolpropane and pentaerythritol; the polyacid comprises at least one of isophthalic acid and phthalic anhydride; and the naturally occurring oil or fatty acid comprises at least one of soybean oil and tall oil fatty acid.

13. The acrylate-functionalized alkyd coating composition of claim 11, wherein the sulfomonomer is 5-sodiosulfoisophthalic acid.

14. The acrylate-functionalized alkyd coating composition of claim 1, wherein the drier mixture further comprises at least one member selected from the group consisting of a zirconium salt, a zinc salt, and a manganese salt.

15. The acrylate-functionalized alkyd coating composition of claim 9, wherein the glycidyl acrylate is glycidyl methacrylate.

16. The acrylate-functionalized alkyd coating composition of claim 9, wherein the glycidyl acrylate is glycidyl acrylate.

17. The acrylate-functionalized alkyd coating composition of claim 1, further comprising a surfactant.

18. The acrylate-functionalized alkyd coating composition of claim 1, further comprising at least one member selected from the group consisting of a flow control agent, an extender, a plasticizer, a flatting agent, a pigment wetting agent, a pigment dispersing agent, an ultraviolet light absorber, an ultraviolet light stabilizer, a tinting pigment, a colorant, a defoaming agent, an antifoaming agent, an anti-settling agent, an anti-sag agent, a bodying agent, an anti-skinning agent, an anti-flooding agent, an anti-floating agent, and a corrosion inhibitor.

19. A method of making an acrylate-functionalized alkyd coating composition, comprising the step of combining (a) an acrylate-functionalized alkyd resin comprising the reaction product of:

i) an alkyd resin having an acid number of from about 3 to about 50 mg KOH/g, and (ii) a glycidyl acrylate, wherein the glycidyl moiety of the glycidyl acrylate is the reactive moiety and the reaction product contains reactive acrylate moieties; with (b) a drier mixture that comprises at least 0.01 wt % cobalt, based on binder solids, and from 0.15 to 5.0 wt % calcium, based on resin solids; and (c) a solvent selected from the group consisting of water, an organic solvent, and mixtures thereof.

20. The method of claim 19, wherein:

the acrylate-functionalized alkyd resin is present in an amount of from about 50 to about 98 wt %, based on the total weight of the composition;

the drier is present in an amount of from about 0.01 to about 3.0 wt % of the metal, based on the total weight of the composition; and the organic solvent is present in an amount of from about 1 to about 50 wt %, based on the total weight of the composition.

21. The method of claim 19, wherein:

the acrylate-functionalized alkyd resin is present in an amount of from about 30 to about 60 wt %, based on the total weight of the composition;

the drier is present in an amount of from about 0.01 to about 3.0 wt % metal, based on the total weight of the composition; and the solvent comprises water, present and in an amount of from about 40 to about 70 wt %, based on the total weight of the composition.

22. A substrate coated with the acrylate-functionalized alkyd coating composition of claim 1.

23. A substrate coated with the acrylate-functionalized alkyd coating composition of claim 2.

24. A substrate coated with the acrylate-functionalized alkyd coating composition of claim 5.

* * * * *